Figure 1:
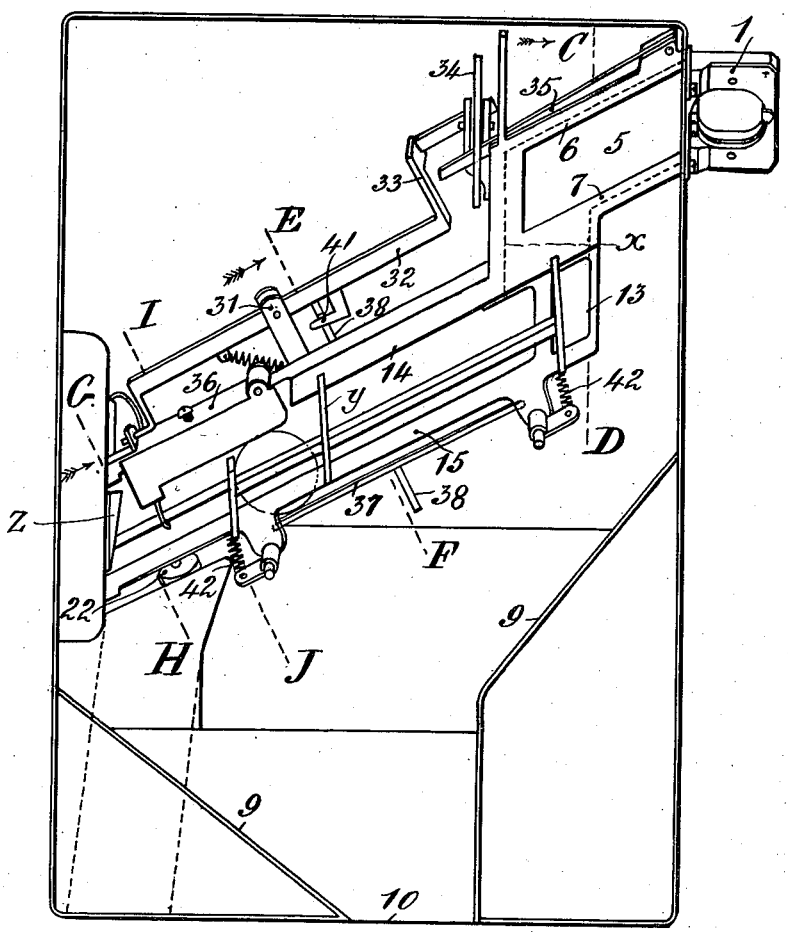

W. H. BEDDARD.
COIN TESTING MACHINE.
APPLICATION FILED JULY 18, 1912.

1,187,239.

Patented June 13, 1916.
6 SHEETS—SHEET 1.

Witnesses

Inventor
William H. Beddard

W. H. BEDDARD.
COIN TESTING MACHINE.
APPLICATION FILED JULY 18, 1912.

1,187,239.

Patented June 13, 1916.
6 SHEETS—SHEET 3.

Fig. 3.

W. H. BEDDARD.
COIN TESTING MACHINE.
APPLICATION FILED JULY 18, 1912.

1,187,239.

Patented June 13, 1916.
6 SHEETS—SHEET 4.

Witnesses:

Inventor
William H. Beddard
by
James L. Norris, Atty

W. H. BEDDARD.
COIN TESTING MACHINE.
APPLICATION FILED JULY 18, 1912.
1,187,239.
Patented June 13, 1916.
6 SHEETS—SHEET 5.
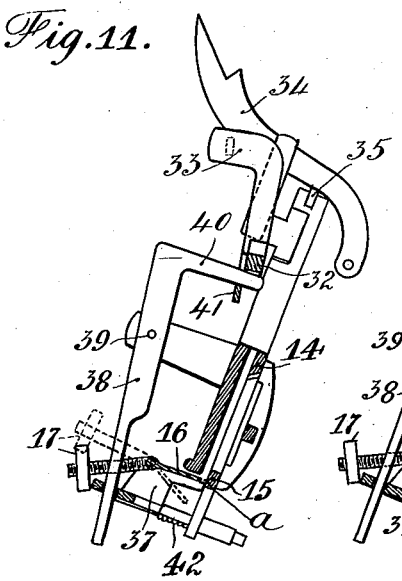
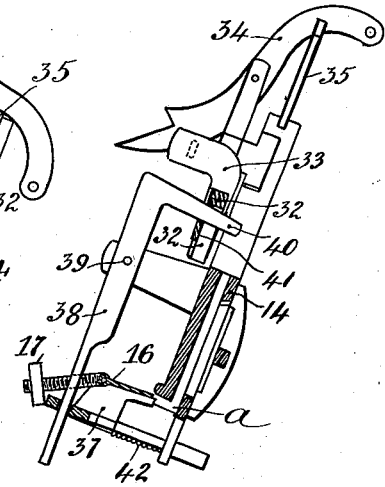
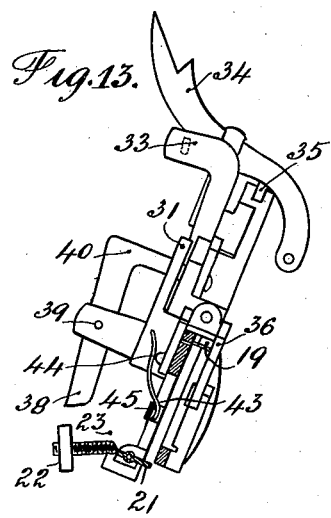
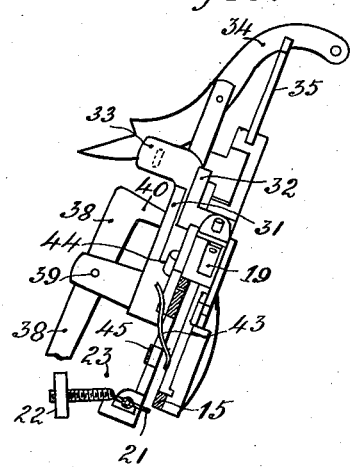

W. H. BEDDARD.
COIN TESTING MACHINE.
APPLICATION FILED JULY 18, 1912.

1,187,239.

Patented June 13, 1916.
6 SHEETS—SHEET 6.

Witnesses:

Inventor
William H. Beddard

UNITED STATES PATENT OFFICE.

WILLIAM HENRY BEDDARD, OF SMALL HEATH, BIRMINGHAM, ENGLAND.

COIN-TESTING MACHINE.

1,187,239.

Specification of Letters Patent. Patented June 13, 1916.

Application filed July 18, 1912. Serial No. 710,271.

*To all whom it may concern:*

Be it known that I, WILLIAM HENRY BEDDARD, subject of the King of Great Britain, residing at 75 Waverley road, Small Heath, Birmingham, in the county of Warwick, England, have invented certain new and useful Improvements in Coin-Testing Machines; and I do hereby declare that the following is a full, clear, and exact description of the same.

The invention provides the hereinafter described and claimed improvements in a coin testing machine for use in combination with all pre-payment automatic delivery machines.

The object of the invention is to provide a coin testing machine of great accuracy, that is to say which will eject all rubbish, and reject all coins except the correct one which it will pass to become operative in an automatic delivery machine.

The mechanism according to the invention tests as regards thickness, diameter, weight, and character of metal, the latter by velocity against a resistance, and preferably the coin testing machine employs in combination, a device for preventing the insertion of coins or articles exceeding the predetermined thickness, a second device for rejecting rubbish or small articles or coins, a third device for rejecting coins very slightly under size, those which are too thin, and those which are too heavy and have a slow velocity or travel through a certain part of the machine, a fourth testing device for eliminating coins only slightly exceeding a predetermined diameter, or not possessing the necessary velocity, and a fifth device for rejecting those coins which are either too light in weight or lacking in velocity, or both, it being understood that the rate of travel of the coin through the testing machine according to the invention plays a most important part in the testing.

The invention for convenience will be hereinafter described in connection with the drawings carried out to pass only an English penny, but it will be obvious that said invention may be arranged to pass any particular coin only, and reject all others.

Figure 2:
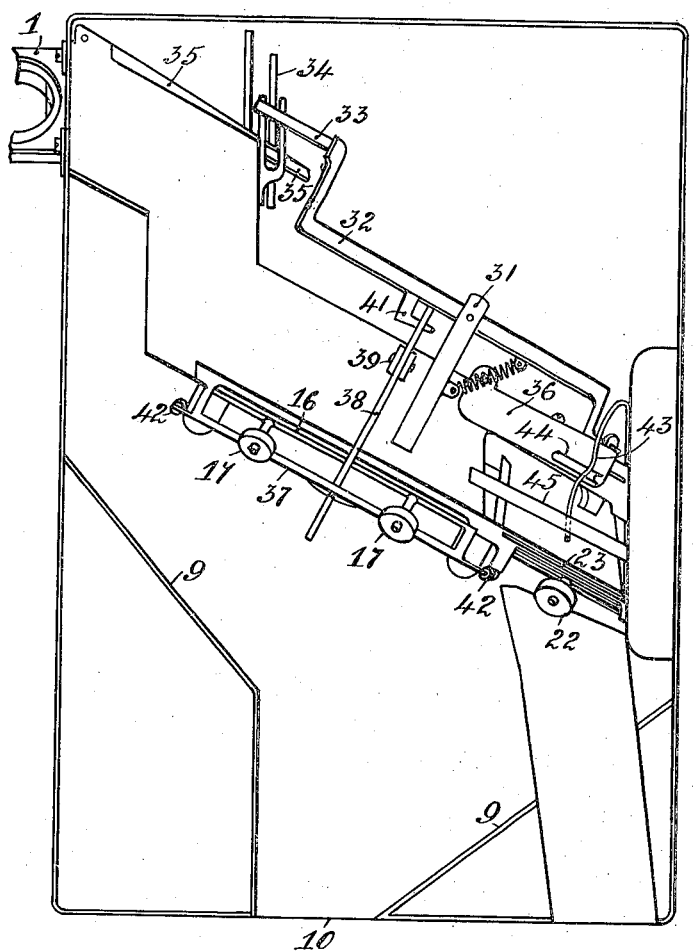
Figure 5:
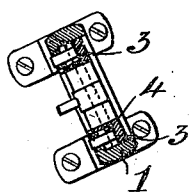
Figure 4:
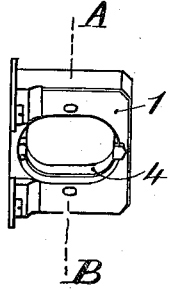
Figure 6:
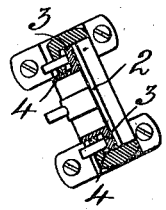
Figure 7:
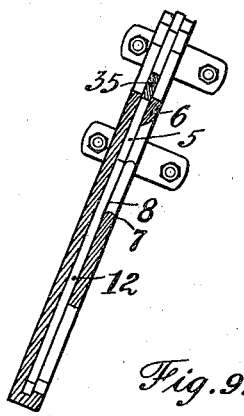
Figure 8:
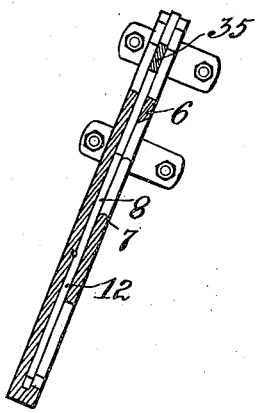
Figure 9:
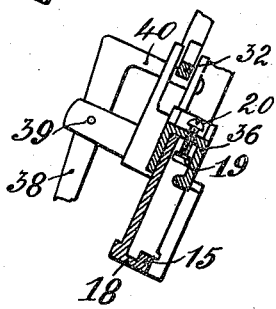
Figure 10:
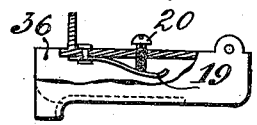
Figure 15:
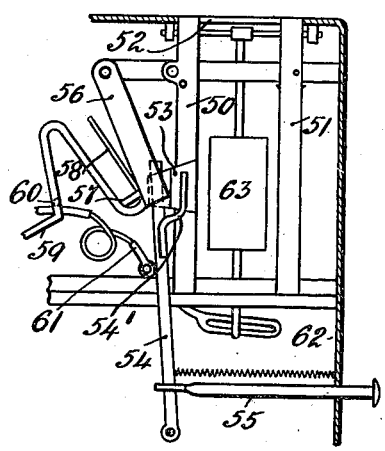
Figure 16:
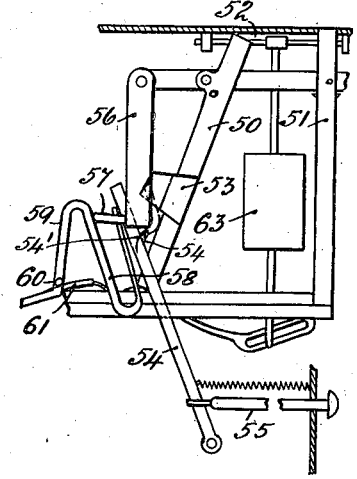
Figure 17:
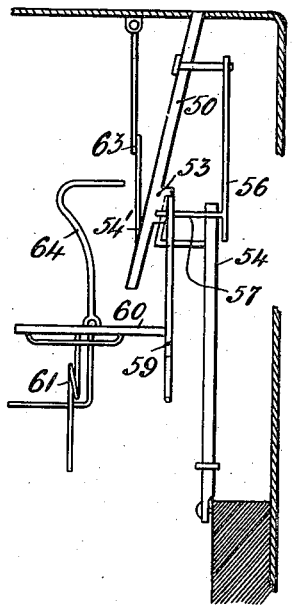
Figure 18:
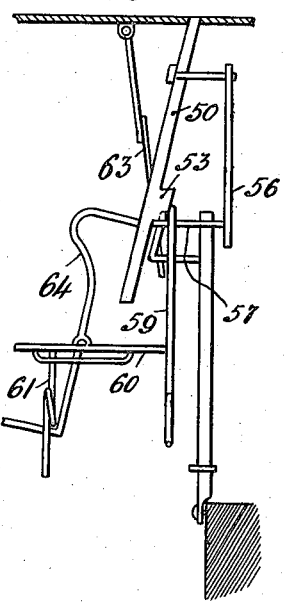

Figure 1 is a side elevation, the casing being removed. Fig. 2 is a similar view but looking from the other side. Fig. 3 is a similar elevation as Fig. 1 but showing the parts in their positions when a coin is being inserted into the machine. Fig. 4 illustrates the coin inlet device preventing the insertion of anything thicker than that predetermined, and also to a considerable extent preventing the insertion of rubbish. Fig. 5 is a transverse section of Fig. 4 on the line A—B with the parts in normal positions. Fig. 6 is a similar section with the parts in a different position, namely while a coin is being inserted. Fig. 7 is a section of the first incline on the line C—D Fig. 1 looking in the direction of the arrow. Fig. 8 is a section similar to Fig. 7 but showing the parts in the positions they assume when a coin is being inserted. Fig. 9 is a transverse section of Fig. 1 on the line I—J showing the adjustable spring employed in connection with the second incline for preventing the passage of coins exceeding a predetermined diameter and also those which do not possess the necessary velocity. Fig. 10 represents, separately, the upper carrier of the third incline. Fig. 11 is a section of the second incline at E—F Fig. 1, looking in the direction indicated by the arrow. Fig. 12 is a similar section showing the parts in the positions they occupy when a coin is being inserted, the parts being in their clearing positions. Fig. 13 is a section at G—H Fig. 1, looking in the direction indicated by the arrow, and therefore through the final testing device. Fig. 14 is a section similar to Fig. 14 but with the parts in the positions they occupy when a coin is passing through the slot. Fig. 15 is a side elevation of a modified form of rubbish ejector with the parts in clearing positions. Fig. 16 is a similar view in the position ejecting rubbish. Fig. 17 is an end elevation looking from left to right Fig. 15, the parts being in their normal positions. Fig. 18 is a similar view to Fig. 17 showing the parts in the positions they occupy when ejecting rubbish.

In a machine as illustrated in Figs. 1 to 14 of the accompanying drawings the coin is successively tested by five different mechanisms, and for convenience these will be described separately and in the order in which they are reached by the coin when passing through the machine.

The machine may be used for testing any suitable coin, but for convenience it will be referred to herein as a penny testing machine, the machine being particularly useful for attachment to a penny-in-the-slot delivery machine, whereby only coins of the prescribed value are passed to the delivery machine, all defective coins, rubbish, disks or the like being rejected by the machine and being, preferably, thrown out entirely or returned to the operator.

As is well known pennies of older currency are slightly smaller than the newer ones, and for this reason in a reliable penny testing machine it is necessary to pass both the old pennies, which are small in diameter and thin, and the newer ones which are larger and thicker, while all rubbish, disks or defective coins must be rejected.

By the present invention a series of coin testing devices are provided in the design of which mechanisms are provided for first refusing to admit coins or disks of a greater thickness than a penny, coins, disks or rubbish of smaller diameter being rejected at the second stage, while at the third stage disks which are too heavy and those which are of such a metal as to roll slowly down the incline, or those which are only slightly under size in diameter, are all rejected. At the fourth stage is a means for preventing the passage of coins exceeding a predetermined diameter or of a coin of the correct size not possessing sufficient velocity, and at the fifth testing appliance, coins and disks which are of the same diameter and thickness but lighter in weight or have not sufficient velocity are rejected.

As illustrated in the accompanying drawings the coin inlet consists of a framework 1 recessed to correspond with the shape of a penny, the said recess communicating with a slot 2 which admits the coin to the interior of the coin testing machine. In the said recess there is a seating 3 which is advanced by a spring 4 to normally close the slot 2 and prevent the admission of dust and other objectionable matter, as seen in Fig. 5. When the coin is placed on the seating and the seating pressed back to the position shown in Fig. 6 the slot 2 is uncovered, whereupon the coin may be inserted edgewise. It will be obvious that if this slot corresponds in width with the maximum thickness of a penny it will then be impossible to insert any coin, disk or rubbish of a greater thickness, and this part of the machine rejects all that is of excessive thickness. Immediately after passing through the slot 2 the penny reaches the first incline, 5, the coin being supported between the upper and lower carrying rails 6, 7, forming the under wall thereof and the base member 8, and as these parts are inclined laterally at the angle shown in Figs. 7 and 8 it will be obvious that any small disks or rubbish will fall through the space between the upper and lower carrying rails, and thus this part of the machine may be termed a rubbish ejector inasmuch as it throws out anything which does not approach the diameter of a penny. The casing is formed with a series of inclines, all numbered 9, in its base converging at the opening 10 through which all rejected coins, disks or rubbish pass out of the machine.

After passing over the first incline the coin falls downwardly through the opening 12, shown in Figs. 7 and 8 and by the dotted lines in Fig. 1, on to the second incline 13, which is set at a similar transverse angle, the coin being retained on the incline by the spaced upper and lower carrying rails 14 and 15 which constitute its under wall; and it will be obvious that immediately the coin is released from the support of the upper rail it will fall forwardly through the space between said upper and lower rails. On reaching the opening 12 that leads to the second incline the coin strikes against a fixed, vertical abutment $x$, constituted by the lower end wall of the first incline, the impact causing the coin to lose the momentum or velocity which it has acquired during its passage down the first incline. As a result, when the coin drops through opening 12 onto the second incline, it will start to roll by gravity only. On reaching this second incline, the coin falls onto a fixed base of which a pivoted member or flap 16 (Figs. 2, 11 and 12) forms a continuation, the said member having a length which must necessarily be approximately three times the diameter of the coin, and over this pivoted member the coin or disk rolls. The pivoted member is balanced by an adjustable weight or weights 17, 17, so that if an overweight coin or disk passes onto the pivoted member, said pivoted member will be depressed against the balance weight and the coin or disk will then fall through. The second incline is also provided with a fixed abutment $y$, in the nature of a vertical bar, which is connected at opposite ends to the rails 14 and 15. The arrangement is such, therefore, that a coin which has depressed the pivoted member 16 will become disengaged from the upper rail 14 and slide sidewise along the lower rail 15 until its progress is stopped by striking against the abutment $y$. There is a clearance or slot $a$ (Fig. 11) between this pivoted member and the lower rail 15, so that a disk or coin of a less thickness than a penny will either fall through the opening or will first become wedged and finally fall through in manner hereinafter explained when the next coin is inserted. It will be obvious that a rolling coin or disk will exert less downward pressure than a stationary coin or disk of the same weight, and for this reason the balance weights are so adjusted as to just support a penny rolling at the velocity which it will attain on passing through the various mechanisms.

Disks made of different metals or alloys to the size of a penny but of the same volume will vary in weight and their surface and frictional properties will be so different that they will roll at different velocities; so that by this mechanism the coin or disk is metallurgically tested to some extent to ascertain whether its constitution corresponds with that of a penny. Pennies of the older or Queen Victoria age were manufactured of slightly smaller diameter than those of the later or King Edward era, while the former coins have naturally been worn thinner than the new ones; and it is the object of the present invention to pass coins of either of such forms but to reject everything else. As the coins roll over the pivoted member, said pivoted member will be depressed to various extents depending upon their velocity, composition and weight. If the coin or disk is too heavy or moves too slowly it will be obvious that the pivoted member will be depressed and the coin will be released from engagement with the upper rail, falling through the opening between the upper and lower rails. A King Edward penny being heavier than a Queen Victoria one will obviously depress the pivoted member to a greater extent, but as its diameter is also greater it will not be released from engagement with the upper rail. Beyond the pivoted member 16 the lower carrier has a solid base marked 18 in Fig. 9. Over this fixed base and within the pivoted member 36 is a leaf spring 19 the position of which is adjusted by the screw 20, so arranged that when a coin exceeding a predetermined diameter rolls over the incline its motion is arrested and the coin rejected when the next coin is inserted. This spring is arranged to slightly touch the coins of the correct diameter as they roll down, and obviously if such do not possess the necessary velocity, as when deficient in weight, they will also be arrested and rejected.

Inasmuch as it is the function of the spring 19 to arrest or reduce the force of coins or tokens which upon leaving the member 16 do not possess a determined degree of velocity it is necessary that the velocity of coins passing under said spring shall be exactly regulated to be greater or less in accordance with the good or bad character of such coins. The pivoted member or flap 16 plays an important part in the regulation of the velocity of the coins as they pass under the spring 19. When a coin rolls over the member 16, whether it be a good one or a bad one, it will depress said member to a greater or less extent. Any depression of the member 16, no matter how small, causes said member at its outer end to form a step with the fixed or solid base 18 of the chute; and the coin in rolling from the member 16 onto the base 18 must mount this step. The velocity of the coins passing under the spring 19 will vary in degree with the step formed conjointly by the member 16 and the base 18. As this step is smaller or larger the velocity of the coin will be proportionately greater or less. Consequently, the spring 19 is set with relation to a determined velocity check effected by the platform 16 and the base 18. If the coin upon reaching the base 18 does not have the degree of velocity determined upon for correct coins, its travel will either be wholly arrested by the spring 19 or so reduced that the coin will not pass the fifth test to be now described. After passing successfully the fourth test the coin or disk reaches the fifth testing mechanism the base of which consists of another pivoted member 21 (Figs. 13 and 14) supported by a balance weight 22, so arranged as to allow all coins or disks of as great a weight as a penny to fall through, but as previously explained abnormally heavy coins or disks will have fallen through at the previous incline or test, so that only those which actually correspond in weight with a penny will operate this last flap, from which they pass to an inlet in the automatic delivery machine when used in conjunction with same. If a coin is too light the pivoted member will not open, and the coin remains in position on same until the machine is next operated, when it falls forwardly and passes out through the rejecting outlet. A wire spring 23 is shown as being employed for limiting the movement of the pivoted member, and thus preventing it getting out of balance. The incline, whose base is constituted by the pivoted member or flap 21, is closed at its lower end by a fixed abutment z, which is disposed at less than a right angle to said member, the result being that a coin, on striking against said abutment, is reflected downward to a slight extent against said member by the force of the impact, and it is this reflecting force which causes the coin to act upon and open the said member, in accordance with its velocity. The coin, therefore, will be forced through the opening covered by the member 21, when the force of the blow is sufficient, but not otherwise.

It will be apparent from the foregoing description that the spring 19 regulates the force with which the coin is reflected against the pivoted member or flap 21. If said spring were not provided, an incorrect coin, lacking the velocity of a correct one, might still have sufficient velocity to depress the member 21 and pass thereby to the inlet of the delivery machine. The spring 19 checks the velocity of coins in all instances and so reduces the velocity of incorrect coins that they will lack sufficient force when reflected by the abutment z to effect a depression of the member 21 or, at most, a depression of said member sufficient to permit their escape from the chute.

Means are provided so that immediately a coin is inserted all the mechanisms are brought into their released positions to throw out all coins or disks which have not been accepted or actually thrown out: or a plunger or lever may be employed for actuating this mechanism instead of it being operated by the insertion of another coin or disk.

Above the second incline is a bracket 31 which carries a pivoted lever 32 having a cranked end 33 which engages a pivoted transverse lever 34, the other end of which is in engagement with another pivoted lever 35: this lever 35 being located over the first incline and so arranged that it is raised when a coin is inserted: the insertion of a coin consequently depressing the cranked end 33 of the lever 32 and raising its lower end. To the lower end of this lever 32 is connected the part 36 which forms the upper carrier of the third incline, and obviously when this end of the lever 32 is raised the coin will fall out onto one of the ejecting inclines 9. Thus a coin or disk too light in weight to operate the last pivoted base member will be rejected together with any coin or disk remaining at the fourth testing mechanism when the next coin is inserted.

The pivoted member 16 is not carried by a fixed part of the machine but by a transversely movable frame 37, which is engaged by the lower end of the lever 38, pivoted at 39, and having its upper cranked end 40 in engagement with the cranked part 41 on the lever 32, so that when said lever 32 is depressed the frame 37 and its pivoted member are moved thereby, as shown by Fig. 12, to uncover the opening in the base, when any coin or disk resting thereon will fall through; the parts being returned to their normal positions by the spring 42. To insure a defective coin or disk being thrown off the pivoted member 21 when the next coin or disk is inserted, I have shown a spring 43 normally held out of engagement by a projection or cam 44 on the part 36 and against the stop 45, but immediately the part 36 is raised the spring will serve to knock off any stationary coin or disk. If a disk of slightly smaller diameter than a penny is inserted then it will be rejected at the second incline if it is heavier, or of the same weight, while if it is lighter then its downward pressure will not have been sufficient to release it from the upper rail, and consequently it is not rejected until it reaches the fifth testing device, together with any disk which might have been stopped at the fourth testing mechanism. If the inserted disk be of the same diameter but thinner then it will be rejected at the second incline, whether it be of the same weight, or lighter or heavier.

If the disk be of the same diameter and thickness then it will be rejected at the second incline if it is heavier, or at the fifth testing device if lighter, while if of the same weight its rejection will depend upon its velocity, which will in turn depend, to some extent, upon the metallurgical composition of the disk. If the velocity is less than that of a penny it will fall out at the second incline, or if its diameter is out of proportion to its velocity it will fall out at the fourth test.

An alternative form of rubbish rejector for use with any coin testing machine is shown in Figs. 15 to 18. The admission slot 52 is in the top of the casing, and the coin immediately after passing through this slot enters the two slides 50, 51, from which it passes to a second inclined member similar to that previously shown and described. When rubbish such as cardboard is inserted it may stick in the two slides 50, 51, and is removed in the manner hereinafter explained.

Attached to the slide 50 is a bracket 53 engaged by a vertically pivoted lever 54, which is engaged by a plunger 55 in such manner that when the plunger is operated the slides are expanded. Secured to the pivoted member 54 is a hooked member 54' which engages another pivoted member 56, which also moves with the member 54, the member 56 having a transverse arm, 57, which engages the inclined end, 58, of a pivoted lever, 59, corresponding with the lever 32; while said lever 59 also carries an arm 60. When the inclined end of the lever 59 is depressed, then by the arm 60 it operates another pivoted lever 61, which has a slotted end 62 engaging a transversely pivoted lever 64, the upper end of which is then caused to move forwardly and, striking the hanging flap 63, pushes same forwardly and ejects any rubbish which may be stuck in the slide. If desired, the coin testing device may be connected to an automatic delivery machine by any suitable mechanism, so that when the automatic machine is operated the releasing mechanism of the testing machine is also operated to clear out any coin or disk which may be in same.

Having now described my invention what I claim and desire to secure by Letters Patent is:—

1. In a coin-testing machine, the combination of upper and lower transversely-inclined chutes having a vertical coin passage connecting their presented ends, the upper chute having an open side through which undersized coins may drop and having coin-retaining rails adjacent the upper and lower edges of said open side, said upper chute being provided at its discharge end with a fixed, vertical abutment against which a coin passing through that chute is adapted to strike before falling through said passage into the lower chute, whereby the coin, on entering the said lower chute, will commence its rolling movement through the force of gravity alone.

2. In a coin-testing machine, the combination of a transversely inclined chute, a counter-weighted member extending longitudinally of said chute and constituting a portion of its bottom, said member being evenly pivoted on a longitudinal axis at one side thereof and having a length which is approximately three times the diameter of the coin, to give time for the effect of the coin's developed velocity to act upon said member, and means for causing the coin on entering said chute to commence its rolling movement along said member through the force of gravity alone.

3. In a coin-testing machine, the combination of a transversely-inclined chute having its under wall consisting of upper and lower rails arranged in spaced, parallel relation, against which wall the under face of each coin passing through the chute is adapted to frictionally contact; a counter-weighted member disposed longitudinally of said chute and constituting a portion of its bottom, said member being evenly pivoted on a longitudinal axis at one side thereof and adapted to be depressed by each coin passing thereover, in accordance with the weight and velocity of such coin, whereby a coin having greater than a given weight or less than a given velocity will be caused to disengage said upper rail; and a fixed, vertical abutment adjacent the lower ends of said rails and adapted to be struck by such disengaged coins, to stop the progress of said coins.

4. In a coin-testing machine, the combination of a transversely-inclined chute having its under wall consisting of upper and lower rails arranged in spaced, parallel relation, against which wall the under face of each coin passing through the chute is adapted to frictionally contact; a counter-weighted member disposed longitudinally of said chute and constituting a portion of its bottom, said member being evenly pivoted on a longitudinal axis at one side thereof and adapted to be depressed by each coin passing thereover, in accordance with the weight and velocity of such coin, whereby a coin having greater than a given weight or less than a given velocity will be caused to disengage said upper rail, the free longitudinal edge of said member being spaced from the lower rail to produce a clearance slot for thin coins, said slot increasing in width when said member is depressed; and a fixed, vertical abutment adjacent the lower ends of said rails and adapted to be struck by such disengaged coins, to stop the progress of said coins.

5. In a coin-testing machine, the combination of a transversely inclined chute, a counter-weighted member extending longitudinally of the chute and constituting a portion of its bottom, said member being evenly pivoted on a longitudinal axis at one side thereof, means for causing the coin on entering the chute to commence its rolling movement along said member by the force of gravity alone, and a spring connected to the top wall of said chute beyond said member and adapted to contact with the edges of passing coins, to arrest coins having greater than a given diameter or less than a given velocity.

6. In a coin-testing machine, the combination of an inclined chute; a member disposed longitudinally of the chute and constituting a part of its base, said member being longitudinally pivoted at one side thereof; yieldable means for holding said member in normal position, and an abutment closing the lower end of said chute and adapted to be struck by a descending coin, to reflect said coin against said member and cause it to depress the same.

7. In a coin-testing machine, the combination of a transversely inclined chute, a counter-weighted member extending longitudinally of the chute and constituting a portion of its bottom, said member being evenly pivoted on a longitudinal axis at one side thereof and being depressible under the weight of certain coins to uncover the bottom of the chute and permit said coins to fall therethrough, means at the farther end of said member for arresting the travel of certain coins incapable of escaping past said member through the bottom of the chute and means for causing the coins to commence their rolling movement through the chute by gravity only.

8. In a coin-testing machine, the combination of a transversely inclined chute, a pair of counter-weighted members extending longitudinally thereof and constituting portions of its bottom, a solid base intervening between said members and likewise forming a portion of the bottom of the chute, said members being evenly pivoted on longitudinal axes at one side thereof and being depressible under the weight of certain coins, means at the farther end of the second member for arresting the movement of coins through the chute and for reflecting said coins against said member, a spring adjacent the upper side of the chute and beyond the first member for checking the velocity of the coins striking said means, said first member when depressed forming a step with said solid base which more or less checks the velocity of coins passing under said spring, and means for causing the coins on entering the chute to commence their rolling movement by gravity only.

9. In a coin-testing machine, the combination of a transversely inclined chute, a pair of counter-weighted members extending longitudinally thereof and constituting portions of its bottom, a solid base intervening between said members and likewise forming a portion of the bottom of the chute, said members being evenly pivoted on longitudinal axes at one side thereof and being depressible under the weight of certain coins, means at the farther end of the second member for arresting the movement of coins through the chute and for reflecting said coins against said member, a spring adjacent the upper side of the chute and beyond the first member for checking the velocity of the coins striking said means, said first member when depressed forming a step with said solid base which more or less checks the velocity of coins passing under said spring, upper and lower rails at one side of the chute adjoining the free edge of the first member and against which the coins lean during their passage along the first member, an abutment at the end of the first member for arresting the movement through the chute of certain coins disengaged from the upper rail in consequence of the depression of the first member, and means for causing the coins on entering the chute to commence their rolling movement by gravity only.

10. In a coin-testing machine, the combination of a transversely inclined chute, a counter-weighted member extending longitudinally of the chute and constituting a portion of its bottom, said member being evenly pivoted on a longitudinal axis at one side thereof and being depressible under the weight of certain coins to uncover the bottom of the chute and permit said coins to fall therethrough, means at the farther end of said member for arresting the movement of coins through the chute and for reflecting said coins against said member, and a spring adjacent the upper side of the chute for checking the velocity of the coins striking said means.

Signed at Birmingham, in the county of Warwick, England, this tenth day of July 1912.

WILLIAM HENRY BEDDARD.

Witnesses:
C. W. FUERY,
BERNARD H. TINGLE.